Figure 1:
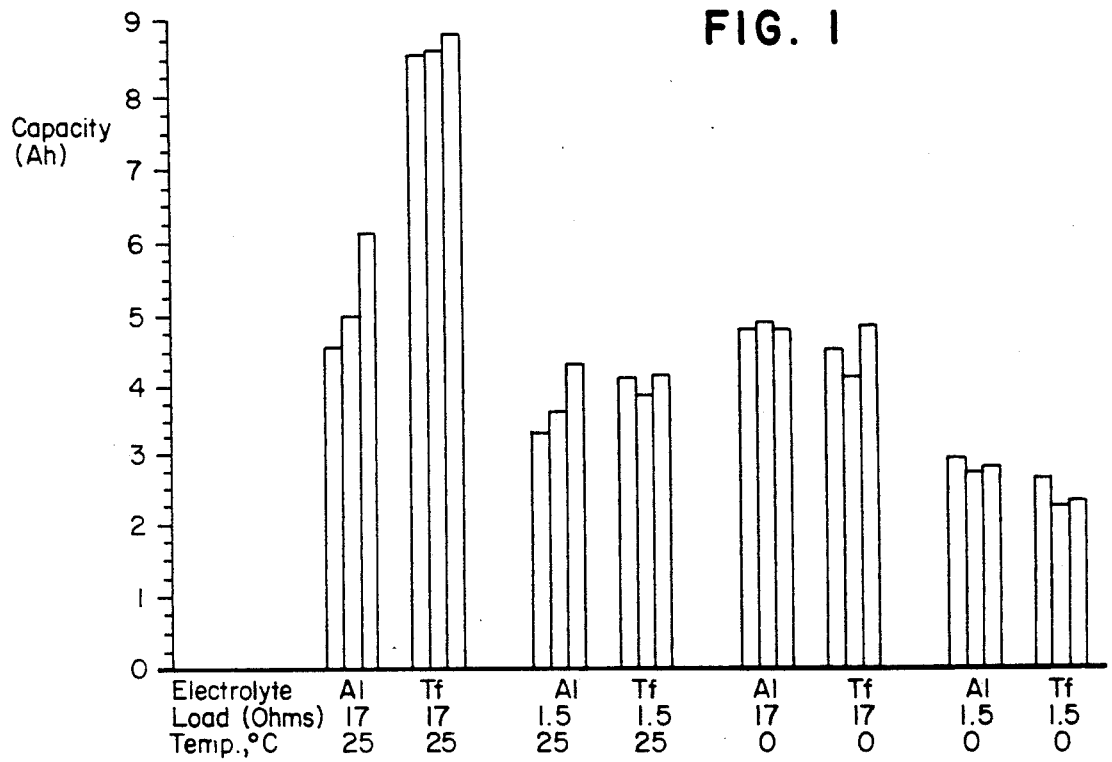

[19] United States Patent
Schlaikjer

[11] Patent Number: 5,182,177
[45] Date of Patent: Jan. 26, 1993

US005182177A

[54] PRIMARY CELL HAVING MINIMIZED DROP IN THE START-UP POTENTIAL
[75] Inventor: Carl R. Schlaikjer, Concord, Mass.
[73] Assignee: Battery Engineering, Inc., Hyde Park, Mass.
[21] Appl. No.: 837,956
[22] Filed: Feb. 20, 1992
[51] Int. Cl.⁵ .............................................. H01M 6/12
[52] U.S. Cl. ...................................... 429/48; 429/101; 429/196
[58] Field of Search ................... 429/48, 101, 194, 196
[56] References Cited

U.S. PATENT DOCUMENTS

| | | | |
|---|---|---|---|
| 4,228,229 | 10/1980 | Gabano et al. | 429/196 |
| 4,277,545 | 7/1981 | Kalnoki-Kis | 429/48 |
| 4,278,741 | 7/1981 | Kalnoki-Kis | 429/48 |
| 4,296,185 | 10/1981 | Catanzarite | 429/48 |
| 4,440,836 | 4/1984 | Bailey | 429/194 X |
| 4,547,441 | 10/1985 | Vallin et al. | 429/196 |
| 4,608,322 | 8/1986 | Howard et al. | 429/196 X |
| 4,608,753 | 9/1986 | Fleischer | 429/196 X |
| 4,869,977 | 9/1989 | Connolly et al. | 429/101 |
| 4,888,255 | 12/1989 | Yoshimitsu et al. | 429/101 |

Primary Examiner—Anthony Skapars
Attorney, Agent, or Firm—Shlesinger Arkwright & Garvey

[57] ABSTRACT

An electrolyte salt is shown herein for use in lithium/thionyl chloride primary cells that is provided to minimize the start-up delay otherwise encountered after too long a storage period or storage at too high a temperature. The salt is a reaction product produced by refluxing lithium triflate with either aluminum chloride or lithium tetrachloraluminate or a mixture of thereof dissolved in thionyl chloride.

21 Claims, 1 Drawing Sheet

PRIMARY CELL HAVING MINIMIZED DROP IN THE START-UP POTENTIAL

This invention provides an electrochemical power source having an ability more effectively to transfer power to an electrical circuit. It is concerned particularly with the composition of a lithium/oxyhalide/carbon high energy density power cell that has an electrolytic composition therein that minimizes the drop in the start-up potential which often results when such cells have been held in storage too long or are stored at a high temperature, the electrolyte also being active to increases the capacity of the cell.

BACKGROUND

It is known that when lithium/thionyl chloride cells have been stored for a long period of time or where the storage temperature is high, that a thicker film of lithium chloride tends to form on the surface of the lithium anode that interferes somewhat with the electrochemical reaction that occurs within the cell when the cell is first put into use. If this film becomes too thick it interferes with the chemical reaction within the cell, and it has been found that when such cells have been stored for a long time or at an elevated temperature, this film becomes somewhat thicker causing lowering of the cell's capacity and a noticeable energy drop in the initial electrical power output from the cell. It is true however, that as the electrical current is continuously drawn from the cell, this thicker lithium chloride layer is undercut and the Chemical reaction proceeds more actively thus restoring the cell to near its normal power output Various proposals have been forthcoming suggesting ways of preventing this lithium chloride film from becoming too thick during a prolonged storage period or after storage at higher than normal temperatures. For example, A perceptible improvement in the start-up ability of such batteries has been accomplished by removing certain impurities from the electrolyte such as hydrolysis products and iron. A full discussion of the problems arising during the storage of Li/SOCl$_2$ cells is included in the article entitled "Electrolyte Induced Film Formation and Voltage Delay in Lithium/SOCl$_2$ Batteries" by Carl R. Schlaikjer published in the Progress in Batteries and Solar Cells (Prog. B & S.) Vol. 4 (1982).

But cleansing the electrolyte alone has not been found to be sufficiently useful to reduce the start-up delay to an acceptable level in batteries that have been stored too long or stored under excessive temperature conditions. When the storage period is unduly prolonged, the electrolyte in the cell does continue to react slowly with the lithium anode to produce a thicker film that inhibits the initial start up ability of the battery. Of course when the storage temperature increases, this reaction is speeded up.

In another study, discussed in an article authored by M. Salomon published in the Journal of the Electrochemical Society, Volume 128, at page 233 (1981), it has been noted that this continuous exchange which takes place between the anode and the electrolyte in the battery that also involves a reaction between this lithium chloride layer that forms on the anode with species in the electrolyte solution which also contributes to the growth of the film itself. In this reaction, larger crystals are formed in the lithium chloride layer at the expense of smaller crystals. Where the film on the anode is the thinnest, reorientation of the material in the layer allows the electrolyte to have access to the lithium anode and corrosion is thus encouraged. To discourage corrosion, a lower concentration of electrolyte salt is needed. However, a lower concentration of LiAlCl$_4$ reduces the rate capability of the cell.

The use of lower concentrations of soluble lithium salts with large anions has been found effective in reducing the voltage delay effect without compromising the cathode's rate capability such as for example the use of closoborate salts such as Li$_2$B$_{10}$C$_{10}$ and Li$_2$B$_2$Cl$_{12}$, which at 0.25 molar concentration have been found to be as effective as 1.8 M LiAlCl$_4$ in thionyl chloride in providing an adequate rate capability in a wound D cell. The use of these salts in a thionyl chloride solvent is described in the ERACOM Report No. DELET-TR-78 0558.1F, May, 1980, G.T.E. Labs. Inc, authored by C Schlaikjer, C.A. Young and M. Dobrusin. It has been found that such a solution produces only a thin lithium chloride film on the anode equivalent to such very thin films as are produced by exposing a lithium anode to a thionyl chloride solvent without an electrolyte salt dissolved therein. It is believed that the rate capability of the cells is maintained because of the low respective mobilities of the large anions of these salts in solution which in turn encourages the transport of lithium ions into the carbon cathode. The large anions also cannot exchange with chloride ions bonded in the salt film, further reducing attack on the protective layer.

Another salt soluble in thionyl chloride that is effective in increasing the rate capability of such wound cells is LiGaCl$_4$ See the U.S. Pat. Nos. to Dey et al, 4,177,329, issued Dec. 4, 1979, 4,238,552, issued Dec.9, 1980 and Re.31,414, issued Oct. 11, 1983. The effect of the LiGaCl$_4$ may also result from the fact that the anion, like B$_{10}$Cl$_{10}^{2-}$, is larger than the AlCl$_4^-$ anion.

LiGaCl$_4$ and the closoborate salts are expensive, and in the case of the closoborate salts, these last named salts may react violently with thionyl chloride when they become heated. And so the search has been ongoing to find a more commercially useful addition that can possibly be made to the electrolyte to provide a more commercially useful answer to the problem of reducing the voltage delay in the start up of these batteries after storage.

Thus, in the prior art it has also been suggested that a lithium salt with large anions such as LiAl(SO$_3$Cl)$_4$ acts to reduce voltage delay in these batteries that have been too long in storage or stored at too high a temperature. However, its utility is restricted because the relatively low solubility of this fully chlorosulfonated aluminate in either sulfur dioxide or thionyl chloride. Note the U.S. Pat. No. to Vallin et al 4,547,441 issued Oct. 15, 1985. The substance of this patent was discussed by the inventors at the 1986 Power Sources Symposium, held at Cherry Hill, N.J.

The U.S. Pat. No. 4,752,541 to Faulkner et al Jun. 21, 1988 is of interest for showing a rechargeable electrochemical battery based upon a sulfur dioxide depolarizer. In this teaching an "uncombined" aluminum chloride is always included in the electrolyte but in addition other lithium salts can also be included. The examples listed include all lithium salts soluble in the sulfur dioxide electrolyte system and included in this list is lithium trifluoromethanesulfonate which ionizes in the sulfur dioxide with an organic cosolvent to lithium cations and anions that can react with the aluminum chloride to produce one or more new lithium salts in solution.

U.S. Pat. No. 4,869,977 to Connolly et al Sep. 26, 1989 describes a rechargeable battery wherein a sulfur dioxide solvent is used in combination with an aluminum chloride and at least one lithium salt in the sulfur dioxide. In order to minimize damage to the porous organic separators certain additives including lithium trifluoromethanesulfonate, can be used.

BRIEF DESCRIPTION OF THIS INVENTION

The present invention is concerned with non-rechargeable primary cell structures that utilize a reactive electrochemical charge which cell includes a lithium anode, a non-aqueous thionyl chloride depolarizer and a suitable cathode such as carbon. The cell includes the reaction product of aluminum chloride and/or lithium aluminum chloride with lithium trifluoromethanesulfonate ( lithium triflate ) in an inorganic solvent. It has been determined that a primary cell so constructed has a faster start-up rate and a larger capacity as compared with primary cells known heretofore.

IN THE DRAWINGS

Figure 2:
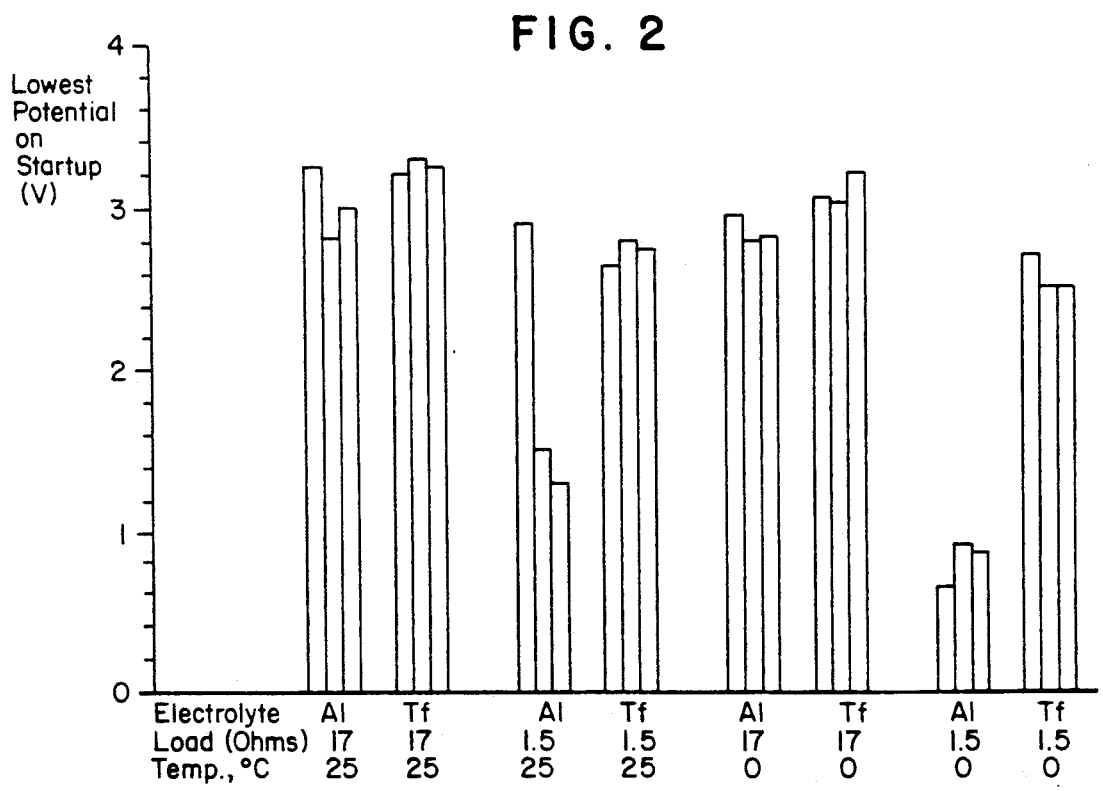

FIG. 1 shows a comparison of the capacities in amperes hours to a cutoff of 2 volts of spirally wound primary C size cells in relation to the load in ohms and the storage temperature for standard cells denoted (Al) compared with similar sized lithium/thionyl chloride cells of this invention denoted (TF); and FIG. 2 shows a similar comparison of the lowest potential in volts reached during start-up for these same cells.

DETAILED DISCUSSION

I have found that when lithium trifluoromethanesulfonate ( lithium triflate ) was reacted with either 1M $LiAlCl_4$ or $AlCl_3$ in thionyl chloride a stable solution resulted. The reaction was accomplished by refluxing stoichiometric amounts of the triflate and aluminum salts at a temperature of 78° at atmospheric pressure for about seven hours. It is my belief that when the reactants are $LiAlCl_4$ and lithium triflate, there is at least a partial substitution of triflate for the chloride, which I believe is substantiated by the data which follow.

In an infrared spectrum analysis of 1M $LiAlCl_4$ dissolved in $SOCl_2$, using a Perkin-Elmer 137 infrared spectrophotometer with a 0.1 mm pathlength demountable solution cell with sodium chloride windows, the regions between 6 and 8 microns, and again between 9.8 and 15 microns were observed. The same test was repeated with 1M $LiAlCl_4$ that had been refluxed for two hours with a stoichiometric amount of lithium triflate. New peaks appeared at 9.68, 9.48 and 7.41 microns.

Spirally wound electrochemical C sized cells were made with 1.0M $LiAlCl_4$ refluxed with lithium triflate, the cells all had lithium anodes, thionyl chloride solvent and carbon cathodes which were compared with a series of standard cells made with 1.8M $LiAlCl_4$ dissolved in thionyl chloride and having lithium anodes/thionyl chloride solvent and carbon cathodes. The data recorded during these comparisons under the different conditions noted, were set forth in the charts illustrated in FIGS. 1 and 2. It is to be noted that the TF batteries containing the lithium triflate reaction product have a uniformly higher start-up potential (V) under all of the conditions of loading and temperature. Also the batteries of this invention have about the same or higher overall capacity as expressed in ampere hours under the same set of circumstances.

It is believed that the improvement occurred at least partially because the substitution of one or more of the chlorides with triflate resulted in the formation of a larger anion whose lithium salt was significantly soluble. The effect would then have been similar to that previously observed with $Li_2B_{10}C_{10}$ or $LiAl(SO_3Cl)_4$.

While the above describes the preferred form of my invention, it is possible that modifications thereof may occur to those skilled in the art that fall within the scope of the following claims.

I claim:

1. An electrochemical cell having an anode, a non-aqueous oxyhalide electrolyte and an electrolyte salt, and a cathode, comprising the addition to the oxyhalide of an electrolyte salt that contains at least a partially substituted product that results- from reacting a chloride selected from the group consisting of aluminum chloride and lithium aluminum chloride with lithium triflate.

2. An electrochemical cell as in claim 1 wherein said anode includes lithium.

3. An electrochemical cell as in claim 1 wherein the oxyhalide is thionyl chloride.

4. An electrochemical cell as in claim 1 wherein said cathode is selected from a group consisting of a current collecting metal and carbon.

5. An electrochemical cell as in claim 4 wherein said metal is selected from a group consisting of nickel and stainless steel.

6. An electrochemical cell as in claim 1 wherein said reaction product is a composition produced by refluxing lithium aluminum chloride with lithium triflate.

7. An electrochemical cell as in claim 1 wherein said reaction product is a composition produced by refluxing aluminum chloride with lithium triflate.

8. An electrochemical cell as in claim 6 wherein said oxyhalide is thionyl chloride.

9. An electrochemical cell as in claim 7 wherein said oxyhalide is thionyl chloride.

10. An electrochemical cell as in claim 1 wherein said oxyhalide consists of thionyl chloride.

11. An electrochemical cell as in claim 1 wherein said reaction product is dissolved in an inorganic oxyhalide.

12. An electrochemical cell as in claim 11 wherein said anode contains lithium and said oxyhalide is thionyl chloride.

13. An electrochemical cell as in claim 11 wherein said cathode is carbon.

14. An electrochemical cell as in claim 13 wherein said anode contains lithium.

15. An electrochemical cell as in claim 1 wherein said partially substituted product is the result of a reflux action.

16. An electrochemical cell as in claim 15 wherein said reflux action was carried on for about seven hours.

17. An electrochemical cell as in claim 16 wherein said reflux action was performed at a temperature in the range of 78° at atmospheric pressure.

18. An electrochemical cell as in claim 6 wherein said reflux action was carried on for about seven hours.

19. An electrochemical cell as in claim 7 wherein said reflux action was carried on for about seven hours.

20. An electrochemical cell as in claim 8 wherein said reflux action was carried on for about seven hours.

21. An electrochemical cell as in claim 9 wherein said reflux action was carried on for about seven hours.

* * * * *